(12) United States Patent
Klein et al.

(10) Patent No.: US 10,094,305 B1
(45) Date of Patent: Oct. 9, 2018

(54) GASOLINE REID VAPOR PRESSURE DETECTION WITH BRUSHLESS FUEL PUMP

(71) Applicant: GM Global Technology Operations LLC, Detroit, MI (US)

(72) Inventors: Dale F. Klein, Hartland, MI (US); Manoharan Thiagarajan, Milford, MI (US); Andrew M. Shaw, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/688,174

(22) Filed: Aug. 28, 2017

(51) Int. Cl.
*F02D 19/06* (2006.01)
*F02D 1/02* (2006.01)
*F02D 1/00* (2006.01)

(52) U.S. Cl.
CPC ........... *F02D 19/0628* (2013.01); *F02D 1/02* (2013.01); *F02D 19/0673* (2013.01); *F02D 2001/0085* (2013.01)

(58) Field of Classification Search
CPC ........ F02D 19/06; F02D 19/0628; F02D 1/02; F02D 19/0673; F02D 2001/0085
See application file for complete search history.

(56) References Cited

U.S. PATENT DOCUMENTS

| | | | |
|---|---|---|---|
| 5,878,727 A | 3/1999 | Huls et al. | |
| 5,884,610 A | 3/1999 | Reddy | |
| 6,499,476 B1 | 12/2002 | Reddy | |
| 9,390,565 B2 | 7/2016 | Thompson et al. | |
| 9,850,853 B2 * | 12/2017 | Dudar | F02D 41/22 |

\* cited by examiner

*Primary Examiner* — Hieu T Vo (57) ABSTRACT

A gasoline Reid vapor pressure (RVP) detection system includes a fuel pump and a motor operating the fuel pump in a forward direction of rotation to feed a gasoline fuel to a vehicle engine. A control device is in communication with the motor selectively directing change from the forward direction of rotation to a reverse direction of rotation opposite to the forward direction of rotation. A pressure reduction device receives flow of the fuel during operation in the reverse direction of rotation and reduces a pressure of the fuel until fuel vaporization occurs. A pump speed at which vaporization of the fuel occurs at the pressure reduction device when a motor speed and a motor current change non-linearly is correlated to a fuel RVP.

20 Claims, 5 Drawing Sheets

GASOLINE REID VAPOR PRESSURE DETECTION WITH BRUSHLESS FUEL PUMP

INTRODUCTION

The present disclosure relates to gasoline fuel Reid Vapor Pressure determination for automobile vehicles.

Gasoline fuels sold for use by automobile vehicles have different volatilities which vary both with different seasons and by different geographic locations. A "winter blend" of fuel is modified to increase its Reid Vapor Pressure (RVP) defined as an absolute vapor pressure exerted by a liquid at 37.8 degrees C. (100 degrees Fahrenheit) as determined by ASTM-D-323, such that the fuel will vaporize more readily at lower winter ambient temperatures. This allows easier engine start. To reduce volatile organic compound (VOC) discharge, a "summer blend" of fuel is modified to decrease its RVP. This reduces fuel vaporization at higher summer operating temperatures both to reduce VOC discharge and to mitigate against vapor lock occurring in the fuel pump system which may cause engine stumble or stall conditions.

The ability to identify the RVP of the fuel in the vehicle storage tank offers the advantage of adjusting low pressure fuel feed pump pressure accordingly. Different approaches to determine RVP are known, but have limitations related to long time delays to identify the RVP, or suffer from a slow frequency of measurement, particularly at vehicle rest. The known approaches also do not allow detection of a change in fuel properties immediately after a refueling event, which is most pronounced when a change from winter to summer blend, or vice-versa may have just occurred. There may also be overlap of one blend present in the fuel tank mixing with the second blend during seasonal changes when determination of an accurate RVP is also important.

Thus, while current methods to determine gasoline RVP levels achieve their intended purpose, there is a need for a new and improved system and method for identifying gasoline RVP for use by the vehicle at the time of vehicle startup and after each refueling stop.

SUMMARY

According to several aspects, a gasoline Reid vapor pressure (RVP) detection system includes a fuel pump and a motor operating in a forward direction of rotation to feed a gasoline fuel to a vehicle engine. A control device is in communication with the motor selectively directing change from the forward direction of rotation to a reverse direction of rotation opposite to the forward direction of rotation. A pressure reduction device or flow restriction receives flow of the fuel during operation in the reverse direction of rotation. A fuel RVP is determined when the fuel passing through the fuel pump following the pressure reduction device vaporizes.

In another aspect of the present disclosure, an engine control module is in communication with the control device using a module controller area network bus.

In another aspect of the present disclosure, an RVP learn enable logic enables within the engine control module when a calibrated engine mode is met.

In another aspect of the present disclosure, the calibrated engine mode defines one of a low or zero fuel demand, an engine off status, and a deceleration fuel cut-off.

In another aspect of the present disclosure, the calibrated engine mode occurs when a fuel feed line is fully pressurized as determined by a fuel pressure signal sent by a fuel line pressure sensor.

In another aspect of the present disclosure, an RVP learn algorithm is triggered by the engine control module to command the fuel pump motor to stop and reverse direction.

In another aspect of the present disclosure, a timer is started by the engine control module when the fuel pump motor is commanded to stop and reverse direction.

In another aspect of the present disclosure, a pump speed at which vaporization of the fuel occurs at the pressure reduction device when a motor speed and a motor current change non-linearly correlates to the fuel vapor pressure at the current fuel temperature, corresponding to the fuel RVP at the standard RVP temperature.

In another aspect of the present disclosure, a pump duty cycle is controlled using a pump duty cycle rate of increase set-point to increase a speed of the fuel pump in the reverse direction of rotation at a rate calibrated within the engine control module.

In another aspect of the present disclosure, the pressure reduction device defines a venturi.

According to several aspects, a gasoline Reid vapor pressure (RVP) detection system includes a fuel pump and a motor operating the fuel pump in a forward direction of rotation to feed a gasoline fuel to a vehicle engine. A control device is in communication with the motor selectively directing change from the forward direction of rotation to a reverse direction of rotation opposite to the forward direction of rotation. A pressure reduction device receives flow of the fuel during operation in the reverse direction of rotation and reduces a pressure of the fuel until fuel vaporization occurs. A pump speed at which vaporization of the fuel occurs at the pressure reduction device or low pressure fuel feed pump when a motor speed and a motor current change non-linearly is correlated to a fuel RVP.

In another aspect of the present disclosure, a pump duty cycle is controlled using a pump duty cycle rate of increase set-point to increase a speed of the fuel pump in the reverse direction of rotation.

In another aspect of the present disclosure, an engine control module is in communication with the control device, the engine control module controlling the pump duty cycle at a rate calibrated within the engine control module.

In another aspect of the present disclosure, an RVP learn enable logic is enabled within the engine control module when a calibrated engine mode is met, with the calibrated engine mode defining one of a low or zero fuel demand, an engine off status, or a deceleration fuel cut-off.

In another aspect of the present disclosure, an RVP learn algorithm is triggered by the engine control module to command the fuel pump motor to stop and reverse direction after the calibrated engine mode is met.

In another aspect of the present disclosure, a check valve is positioned in a fuel feed line directing the fuel to a high pressure pump. A pressure sensor senses a pressure of the fuel feed line, with a signal from the pressure sensor being communicated to the control device.

In another aspect of the present disclosure, the pressure reduction device is positioned upstream of the check valve and flow from the pressure reduction device enters a pump discharge such that flow of the fuel in the pressure reduction device is returned to a module reservoir in a fuel feed tank during reverse operation of the pump.

According to several aspects, a gasoline Reid vapor pressure (RVP) detection system for a motor vehicle includes a fuel pump and a fuel pump motor operating the fuel pump in a forward direction of rotation to feed a gasoline fuel to a vehicle engine. A control device is in communication with the motor. An engine control module is in communication with the control device. An RVP learn enable logic is enabled within the engine control module when a calibrated engine mode is met, signaling the control device to direct change from the forward direction of rotation to a reverse direction of rotation opposite to the forward direction of rotation. A pressure reduction device receives flow of the fuel during operation in the reverse direction of rotation and reduces a pressure of the fuel below an atmospheric pressure until fuel vaporization occurs. A fuel RVP is determined when the fuel passing through the pressure reduction device vaporizes indicated by a non-linear change in a motor speed and a motor current.

In another aspect of the present disclosure, a pump speed at which vaporization of the fuel occurs at the pressure reduction device is correlated to the fuel RVP.

In another aspect of the present disclosure, a temperature sensor identifies a temperature of the fuel. Motor and pump data received by the engine control module via a CAN bus is used by the engine control module to monitor pump performance during enablement of the RVP learn enable logic. The engine control module then selects a pump pressure set point from a pressure set point table.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
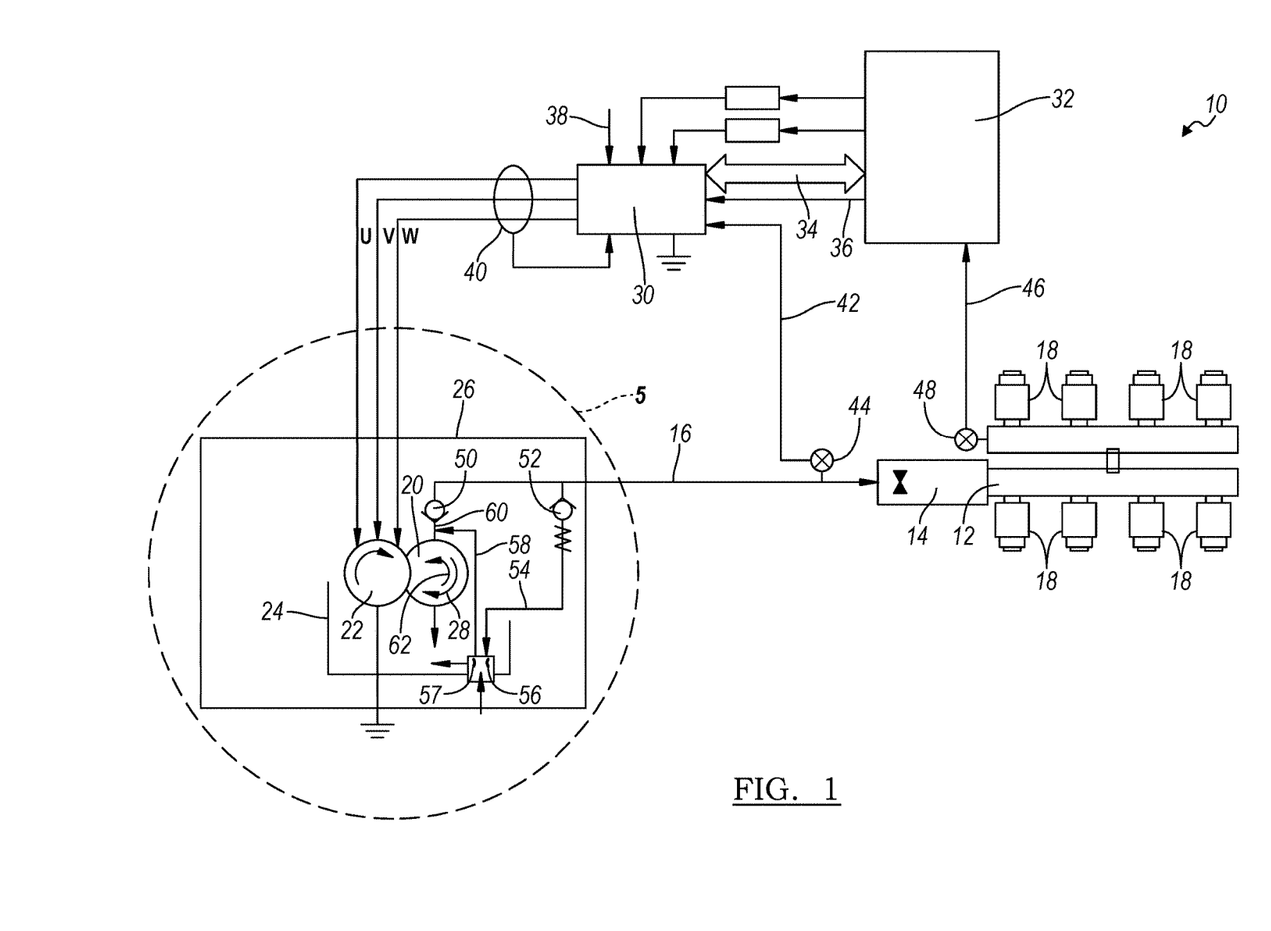
FIG. 1 is a diagrammatic presentation of a gasoline Reid vapor pressure (RVP) detection system according to an exemplary embodiment.

Referring to FIG. 1, a motor vehicle gasoline RVP detection system 10 includes a fuel rail 12 supplied with gasoline fuel using a high pressure pump (HPP) 14 which is fed from a lower pressure fuel feed line 16. Multiple fuel injectors 18 are connected to the fuel rail 12 for supplying the high pressure fuel from the fuel rail 12 to individual engine cylinders (not shown). Fuel is supplied to the fuel feed line 16 using a low pressure pump 20 driven by a DC brushless motor 22. According to further aspects, the DC motor 22 can also be a brushed motor. The low pressure pump 20 draws the fuel from a module reservoir 24 with the low pressure pump 20, the motor 22, and the module reservoir 24 all positioned within a fuel feed tank 26. The low pressure pump 20 normally rotates in a first or forward direction of rotation 28 to feed the fuel into the fuel feed line 16.

The speed and direction of rotation of the motor 22 is controlled using signals from a control device 30 such as a fuel tank zone module which is in communication with an engine control module (ECM) 32 using a module controller area network (CAN) bus 34 and enabled by a fuel control enable signal line 36. A vehicle battery voltage 38 is provided to the control device 30. The motor control signals generated by the control device 30 may be electronically shielded using a shield 40. A fuel pressure signal 42 identifying a fuel pressure in the fuel feed line 16 is continuously monitored by a fuel line pressure sensor 44 and communicated to the control device 30. Similarly, a high pressure fuel signal 46 identifying a fuel pressure in the fuel rail 12 is continuously monitored by a fuel rail pressure sensor 48 and communicated to the ECM 32.

Components also located within the fuel feed tank 26 include a check valve 50 in the fuel feed line 16 which ensures the fuel feed line 16 remains full of fuel and mitigates against air or vapor within the fuel feed line 16 when the HPP 14 is not operating, such as during vehicle shut-down. An over-pressure relief valve 52 is also provided in the fuel feed line 16 between the check valve 50 and the HPP 14 which prevents over-pressurization of the fuel feed line 16 by ambient temperature increase or engine heat load when the HPP 14 is not operating, such as during vehicle shut-down. If the over-pressure relief valve 52 opens discharge flow is directed via a relief valve discharge line 54 to a suction valve 56 for return to the sump associated with the module reservoir 24.

According to several aspects, the suction valve 56 includes a pressure reduction device 57 such as an orifice, a jet pump or a venturi device to generate a differential pressure during reverse operation of the low pressure pump 20. A pump bypass line 58 is provided between the suction valve 56 and a pump discharge 60 for use when the pump 20 is operated in a second or reverse direction of rotation 62 to draw fuel into the low pressure pump 20 at lower flow rate and pressure in order determine a Reid vapor pressure of the fuel supply, which is described in greater detail in reference to FIGS. 2 through 4. According to several aspects, the pressure reduction device 57 is positioned upstream of the check valve 50 and flow from the pressure reduction device enters the pump discharge 60 such that flow of fuel in the pressure reduction device 57 can be returned to the module reservoir 24 in the fuel feed tank 26 during reverse operation of the low pressure pump 20. During normal forward rotation of the low pressure pump 20 there is flow of fuel in the pump line 58 to drive the venturi jet pump device to fill the reservoir 24.

Referring to FIG. 2 and again to FIG. 1, an RVP learn algorithm 64 is used to operate the low pressure pump 20 and motor 22 in a reverse direction. The pump 20 is used as a measurement device drawing fuel through a fixed orifice at variable flow rates, which subjects the fuel to pressures below atmospheric pressure until a point of fuel vaporization is reached, at which point the fuel vapor pressure is detected.

Figure 2:
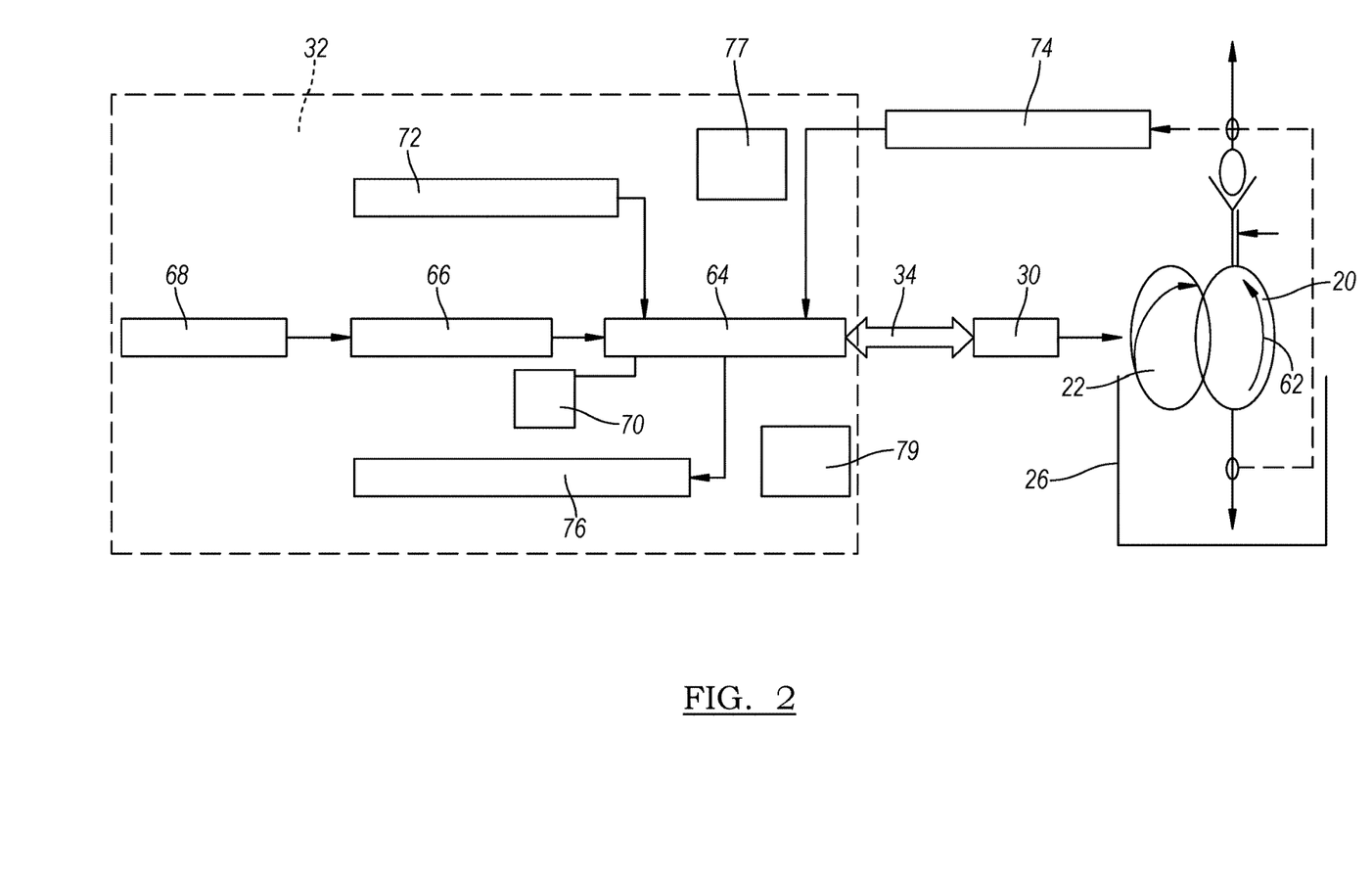
FIG. 2 is a flow diagram of the RVP detection system of FIG. 1.

The RVP learn algorithm 64 follows the following steps. An RVP learn enable logic 66 enables within the ECM 32 when a calibrated engine mode 68 is met. The calibrated engine mode 68 can be a low or zero fuel demand, an engine off status, a deceleration fuel cut-off (DFCO), and the like, and occurs when the fuel feed line 16 is fully pressurized as determined by the fuel pressure signal 42 sent by the fuel line pressure sensor 44. The ECM 32 then triggers the RVP learn algorithm 64 to command the fuel pump motor 22 to stop and reverse direction, thereby rotating the low pressure pump 20 in the reverse direction of rotation 62. The ECM 32 also starts a timer 70 within the RVP learn algorithm 64 at this time.

By controlling a pump duty cycle using a pump duty cycle rate of increase set-point 72, a speed of the low pressure pump 20 is increased in the reverse direction of rotation 62 at a rate calibrated within the ECM 32. As the low pressure pump 20 spins in the reverse direction of rotation 62 fuel flows from the pressure reduction device 57 and the suction valve 56 to the module reservoir 24. As the RVP learn algorithm 64 operates, the ECM 32 monitors the fuel pump motor 22 together with low pressure pump 20 states including pump speed, motor speed, and motor current.

The low pressure pump 20 is operated in reverse until the fuel pressure drops enough to cause the fuel to begin to vaporize. At the point in time when the fuel begins to vaporize, a torque of the fuel pump motor 22 drops which is indicated by both a fuel pump motor 22 speed increase and a low pressure pump 20 speed increase. The RVP learn algorithm 64 records each of the point in time of fuel vaporization (defined above when a sudden or non-linear speed increase of the fuel pump motor 22 occurs and when a sudden or non-linear speed increase of the low pressure pump 20 occurs) and a fuel temperature identified by a signal from a fuel temperature sensor 74 such as a physical sensor, or a model based or virtual temperature sensor, at the point in time of fuel vaporization, before restoring the low pressure pump 20 to normal operation.

Using time data collected by the timer 70 the RVP learn algorithm 64 then correlates a time duration of reverse pump operation, low pressure pump 20 speed and fuel pump motor 22 speed, as well as the low pressure pump motor current to determine a fuel vapor pressure Pv in the fuel feed tank 26 at the present fuel temperature sensed by the fuel temperature sensor 74 and at a present barometric pressure Pb, and identifies an appropriate fuel RVP 76.

Referring to FIG. 3 and again to FIGS. 1 through 2, a graph 78 depicts multiple exemplary low pressure pump 20 conditions including pump speed and pump current plotted on an axis 80, a pump duty cycle plotted on an axis 81 versus time 82, during use of the RVP learn enable logic 66 of the RVP learn algorithm 64. A first curve 84 depicts a pump rpm at a high fuel RVP condition. A second curve 86 depicts the pump motor current in milli-Amps at the high fuel RVP condition. A third curve 88 depicts a pump rpm at a low fuel RVP condition. A fourth curve 90 depicts the pump motor current in milli-Amps at the low fuel RVP condition. A fifth curve 92 depicts a pump duty cycle of the low pressure pump 20 plotted on the axis 81.

Figure 3:
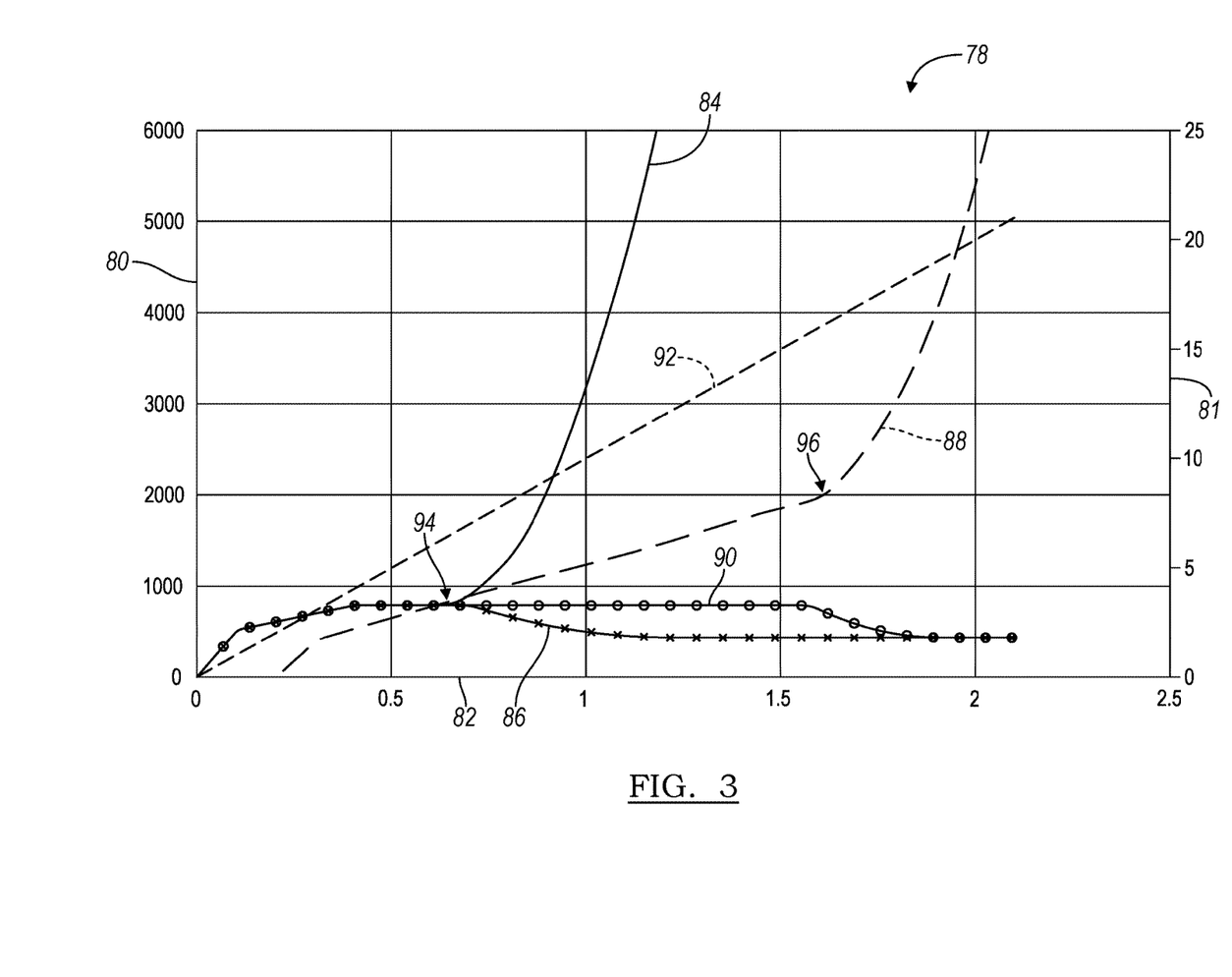
FIG. 3 is a graph depicting multiple low pressure pump conditions including pump speed compared to pump current during use of the RVP detection system of FIG. 1.

As seen in the first curve 84, the pump speed diverges at a first point of vaporization 94 as the fuel begins to vaporize with high RVP fuel and diverges at a second point of vaporization 96 as the fuel begins to vaporize with low RVP fuel. It is apparent the first point of vaporization 94 occurs at both a lower pump speed (approximately 900 rpm) and duty cycle (8%), and at an earlier time (0.65 sec) using high RVP fuel than the second point of vaporization 96 which occurs at both a higher pump speed (approximately 2000 rpm) and duty cycle (16%) at a later time (1.6 sec) using high RVP fuel.

As previously noted, onset of fuel vaporization is detected by a non-linear change occurring in the low pressure pump 20 motor and pump speed. While the low pressure pump 20 is operating in reverse, at a lower fuel flow rate and at an inlet pressure still higher than the fuel vapor pressure, the low pressure pump 20 is operating with liquid fuel, and the motor torque and power balances the turbine pump torque and power. When the low pressure pump 20 is operated at faster speeds in reverse, at increasing fuel flow rates, the restriction of flow through the pressure reduction device 57 of the suction valve 56 or other orifice in the reverse direction causes a decrease in the fuel pressure at the pump inlet, resulting eventually in vaporization of the fuel.

With continuing reference to FIG. 2, motor and pump data is received by the ECM 32 via the CAN bus 34 to monitor pump performance during the RVP learn routine. The ECM 32 will then use the learned RVP value of fuel RVP 76 to select the appropriate electronically regulated fuel system (ERFS) pressure set point table 77. Data from the graph 78 and similar data are saved in database calibratable tables 79 of the RVP learn algorithm 64 such that the appropriate fuel RVP 76 can be used to predetermine or select an ERFS pump set point from the calibratable tables. Prior calibration activity is conducted to correlate fuel vaporization behavior using various fuels with known RVP for the ECM 32 to use as reference values. Calibrating an ERFS requested pressure with knowledge of the fuel RVP 76 mitigates against vapor lock occurring at the HPP 14.

Referring to FIG. 4 and again to FIGS. 1 through 3, a graph 98 depicts a range of fuel pressures 100 versus fuel temperatures 102. A first curve 104 defines a fuel feed pressure request with a high RVP fuel. By comparison, a second curve 106 defines a fuel feed pressure request with a low RVP fuel. A first fuel boiling point curve 108 defines data for a high RVP fuel, and a second fuel boiling point curve 110 defines data for a low RVP fuel. Data points generally to the left of the first fuel boiling point curve 108 as depicted by a first arrow 112 define liquid fuel conditions. Data points generally to the right of the second fuel boiling point curve 110 as depicted by a second arrow 114 oppositely directed with respect to the first fuel boiling point curve 108 define vaporized fuel conditions. An uncertainty zone 116 is present between the first fuel boiling point curve 108 and the second fuel boiling point curve 110 where liquid or vapor conditions could occur depending on the fuel RVP.

Figure 4:
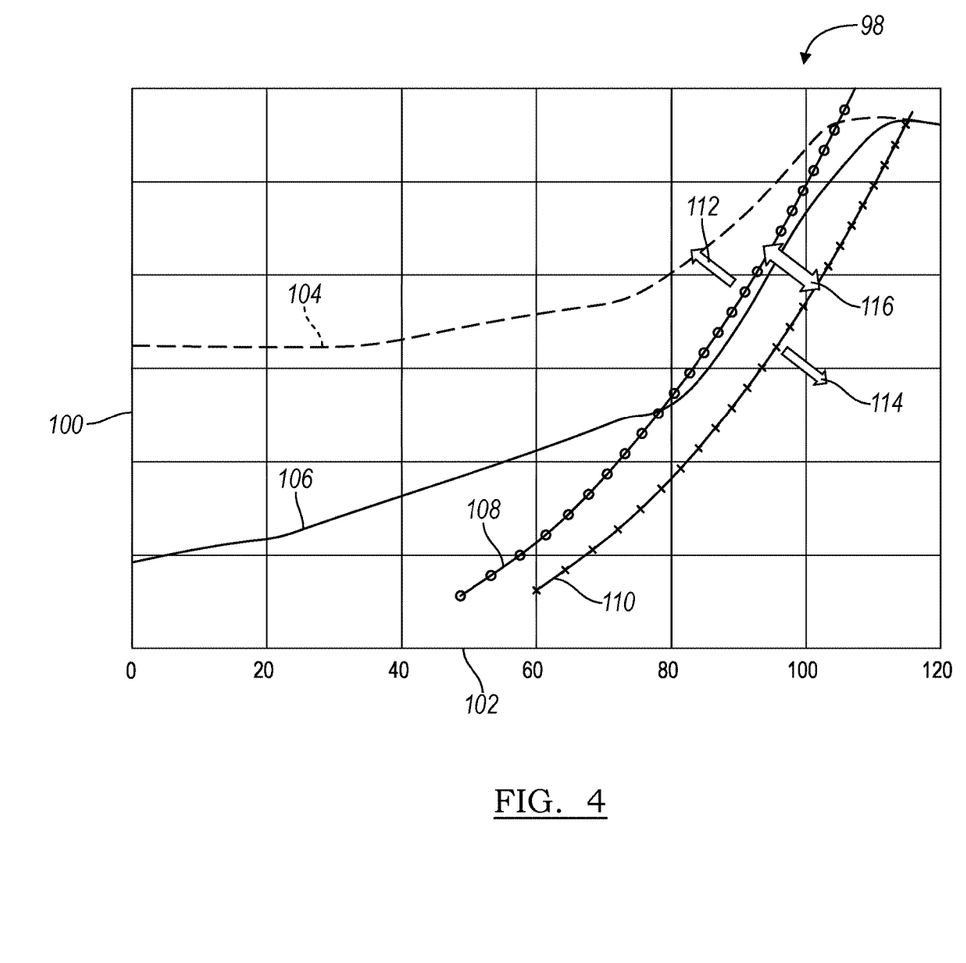
FIG. 4 is a graph depicting a range of fuel pressures versus fuel temperatures for operation of the RVP detection system of FIG. 1.

As shown in FIG. 4, liquid fuel conditions are generally prevalent for substantially all of the points of the first curve 104 defining the fuel feed pressure request with a high RVP fuel. Conditions of uncertainty exist if fuel in the reservoir 24 has RVP properties higher than the fuel boiling point curve 108 at approximately 80 degrees C. and above, when using the curve 106 for fuel feed pressure request. Such variations in fuel properties requires a higher fuel delivery pressure command to avoid conditions of vapor lock at the HPP 14.

Figure 5:
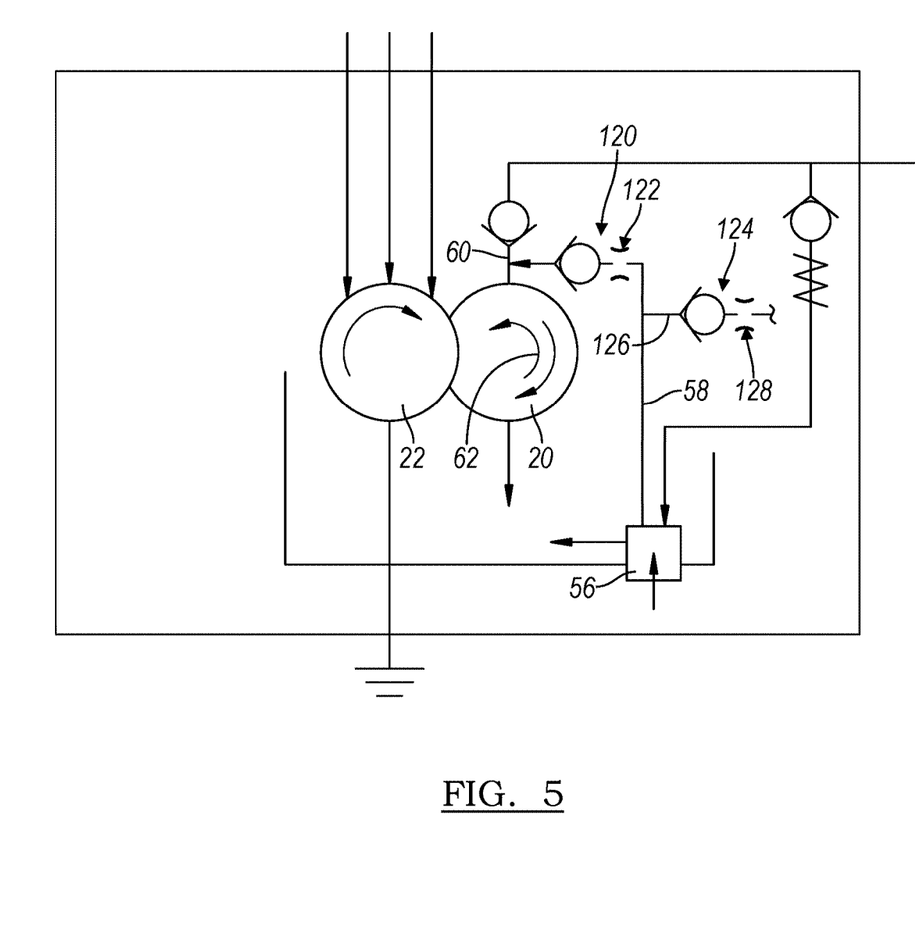
FIG. 5 is an enlarged diagrammatic presentation of area 5 of FIG. 1.

With reference to FIG. 5 and again to FIG. 1, to achieve fuel pressure drop while operating in the low pressure pump 20 reverse direction of rotation 62, in lieu of positioning the pressure reduction device 57 in the suction valve 56, according to several aspects, a check valve 120 can be positioned in the pump bypass line 58 and connected to the pump discharge 60. A pressure reduction device 122 such as a venturi device is positioned upstream of the check valve 120 between the check valve 120 and the suction valve 56. According to further aspects, in lieu of the check valve 120 and the pressure reduction device 122, a check valve 124 can be located in a separate return line 126 which is connected to the pump bypass line 58. A pressure reduction device 128 such as a venturi device is positioned in the return line 126 prior to the check valve 124.

A gasoline Reid vapor pressure detection system and operating method of the present disclosure offers several advantages. These include increased avoidance of fuel RVP variation which induces fuel vapor lock, improved hot fuel handling, and improved fuel delivery controls and diagnostics at any seasonal temperatures. Knowing the fuel RVP and fuel properties allows appropriate commanded fuel pump pressure when required, for example at higher temperatures and engine speeds, while not consistently operating the HPP 14 to over-pressurize when low RVP fuel (summer fuel) is present. By reducing the time of operation at maximum output pressure, improved life of the low pressure pump system 16, 20, 22, 50, 52 can therefore be achieved.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A gasoline Reid vapor pressure (RVP) detection system, comprising:
    a fuel pump and a motor operating in a forward direction of rotation to feed a gasoline fuel to a vehicle engine;
    a control device in communication with the motor selectively directing change from the forward direction of rotation to a reverse direction of rotation opposite to the forward direction of rotation;
    a pressure reduction device or a flow restriction receiving flow of the fuel during operation in the reverse direction of rotation; and
    wherein a fuel RVP is determined when the fuel passing through the fuel pump following the pressure reduction device vaporizes.

2. The gasoline Reid vapor pressure (RVP) detection system of claim 1, further including an engine control module in communication with the control device using a module controller area network bus.

3. The gasoline Reid vapor pressure (RVP) detection system of claim 2, further including an RVP learn enable logic enabling within the engine control module when a calibrated engine mode is met.

4. The gasoline Reid vapor pressure (RVP) detection system of claim 3, wherein the calibrated engine mode defines one of a low or zero fuel demand, an engine off status, and a deceleration fuel cut-off.

5. The gasoline Reid vapor pressure (RVP) detection system of claim 4, wherein the calibrated engine mode occurs when a fuel feed line is fully pressurized as determined by a fuel pressure signal sent by a fuel line pressure sensor.

6. The gasoline Reid vapor pressure (RVP) detection system of claim 2, further including an RVP learn algorithm triggered by the engine control module to command the fuel pump motor to stop and reverse direction.

7. The gasoline Reid vapor pressure (RVP) detection system of claim 6, further including a timer started by the engine control module when the fuel pump motor is commanded to stop and reverse direction.

8. The gasoline Reid vapor pressure (RVP) detection system of claim 1, wherein a pump speed at which vaporization of the fuel occurs at the pressure reduction device when a motor speed and a motor current change non-linearly correlates to the fuel vapor pressure at a current fuel temperature, corresponding to the fuel RVP at a standard RVP temperature.

9. The gasoline Reid vapor pressure (RVP) detection system of claim 2, wherein a pump duty cycle is controlled using a pump duty cycle rate of increase set-point to increase a speed of the fuel pump in the reverse direction of rotation at a rate calibrated within the engine control module.

10. The gasoline Reid vapor pressure (RVP) detection system of claim 1, wherein the pressure reduction device defines a venturi.

11. A gasoline Reid vapor pressure (RVP) detection system, comprising:
    a fuel pump and a motor operating the fuel pump in a forward direction of rotation to feed a gasoline fuel to a vehicle engine;
    a control device in communication with the motor selectively directing change from the forward direction of rotation to a reverse direction of rotation opposite to the forward direction of rotation;
    a pressure reduction device receiving flow of the fuel during operation in the reverse direction of rotation and reducing a pressure of the fuel until fuel vaporization occurs; and
    a pump speed at which vaporization of the fuel occurs at the pressure reduction device or the feed pump when a motor speed and a motor current change non-linearly being correlated to a fuel RVP.

12. The gasoline Reid vapor pressure (RVP) detection system of claim 11, wherein a pump duty cycle is controlled using a pump duty cycle rate of increase set-point to increase a speed of the fuel pump in the reverse direction of rotation.

13. The gasoline Reid vapor pressure (RVP) detection system of claim 12, further including an engine control module in communication with the control device, the engine control module controlling the pump duty cycle at a rate calibrated within the engine control module.

14. The gasoline Reid vapor pressure (RVP) detection system of claim 13, further including an RVP learn enable logic enabled within the engine control module when a calibrated engine mode is met, with the calibrated engine mode defining one of a low or zero fuel demand, an engine off status, or a deceleration fuel cut-off.

15. The gasoline Reid vapor pressure (RVP) detection system of claim 14, further including an RVP learn algorithm triggered by the engine control module to command the fuel pump motor to stop and reverse direction after the calibrated engine mode is met.

16. The gasoline Reid vapor pressure (RVP) detection system of claim 11, further including:
    a check valve positioned in a fuel feed line directing the fuel to a high pressure pump; and
    a pressure sensor sensing a pressure of the fuel feed line, a signal from the pressure sensor being communicated to the control device.

17. The gasoline Reid vapor pressure (RVP) detection system of claim 16, wherein the pressure reduction device is positioned upstream of the check valve and flow from the pressure reduction device enters a pump discharge such that flow of the fuel in the pressure reduction device is returned to a module reservoir in a fuel feed tank during reverse operation of the pump.

18. A gasoline Reid vapor pressure (RVP) detection system for a motor vehicle, comprising:
    a fuel pump and a fuel pump motor operating the fuel pump in a forward direction of rotation to feed a gasoline fuel to a vehicle engine;
    a control device in communication with the motor;
    an engine control module in communication with the control device;

an RVP learn enable logic enabled within the engine control module when a calibrated engine mode is met, signaling the control device to direct change from the forward direction of rotation to a reverse direction of rotation opposite to the forward direction of rotation; and a pressure reduction device receiving flow of the fuel during operation in the reverse direction of rotation and reducing a pressure of the fuel below an atmospheric pressure until fuel vaporization occurs;

wherein a fuel RVP is determined when the fuel passing through the pressure reduction device vaporizes indicated by a non-linear change in a motor speed and a motor current.

19. The gasoline Reid vapor pressure (RVP) detection system for a motor vehicle of claim 18, wherein a pump speed at which vaporization of the fuel occurs at the pressure reduction device is correlated to the fuel RVP.

20. The gasoline Reid vapor pressure (RVP) detection system for a motor vehicle of claim 18, further including:

a temperature sensor, or a physical or a model based virtual temperature sensor identifying a temperature of the fuel; and motor and pump data received by the engine control module via a CAN bus used by the engine control module to monitor pump performance during enablement of the RVP learn enable logic, the engine control module then selecting a pump pressure set point from a pressure set point table.

* * * * *